(12) United States Patent
Takenoshita

(10) Patent No.: US 6,259,370 B1
(45) Date of Patent: Jul. 10, 2001

(54) LEAK SENSOR

(75) Inventor: Etsurou Takenoshita, Kanagawa (JP)

(73) Assignee: Technical & Try Co., Ltd., Kanagawa (JP)

( * ) Notice: Subject to any disclaimer, the term of this patent is extended or adjusted under 35 U.S.C. 154(b) by 0 days.

(21) Appl. No.: 09/613,511

(22) Filed: Jul. 10, 2000

(30) Foreign Application Priority Data

Aug. 3, 1999 (JP) .................................................. 11-252080
Dec. 13, 1999 (JP) .................................................. 11-376592

(51) Int. Cl.[7] .................................................. G08B 21/00
(52) U.S. Cl. ........................... 340/605; 340/619; 250/577
(58) Field of Search .................................. 340/605, 618, 340/619; 250/573, 577

(56) References Cited

U.S. PATENT DOCUMENTS

| | | | | |
|---|---|---|---|---|
| 4,489,239 | * | 12/1984 | Grant et al. | 250/339.03 |
| 4,771,181 | * | 9/1988 | Hayashi | 250/559.24 |
| 5,291,032 | * | 3/1994 | Vali et al. | 340/619 |
| 5,514,920 | * | 5/1996 | Key | 307/118 |

FOREIGN PATENT DOCUMENTS

| | | |
|---|---|---|
| 06160229 | 6/1994 | (JP) . |
| 06160230 | 6/1994 | (JP) . |
| 08122198 | 5/1996 | (JP) . |

* cited by examiner

*Primary Examiner*—Edward Lefkowitz
(74) *Attorney, Agent, or Firm*—Snider & Associates; Ronald R. Snider

(57) ABSTRACT

In a leak sensor including a light-transmitting part 16 constituted by a transparent or semitransparent material, the leak sensor irradiating the light-transmitting part 16 with probe light L in a state where the light-transmitting part 16 is provided so as to face into a region subjected to leak detection 26, and detecting a leaked liquid according to a change in quantity of light L* reflected by a boundary between the light-transmitting part 16 and the region subjected to leak detection 26; the leak sensor 10 comprises an attachment 28 for installing the leak sensor 18 in the region subjected to leak detection 26; the attachment 28 comprising a ground portion 30 grounded on the region subjected to leak detection 26; and mounting portions 36, 38, 40, rising from the ground portion 30, adapted to mount the leak sensor 18 in a state where the light-transmitting part 16 is parallel to the ground portion 30 and in a state where a predetermined space is formed therebetween.

11 Claims, 11 Drawing Sheets

LEAK SENSOR

This application claims the priorities of Japanese Patent Application No. 11-252080 filed on Aug. 3, 1999 and Japanese Patent Application No. 11-376592 filed on Dec. 13, 1999, which are incorporated herein by reference.

FIELD OF THE INVENTION

The present invention relates to a leak sensor; and, in particular, to a leak sensor which optically detects whether or not a leaked liquid has occurred in a region subjected to leak detection.

BACKGROUND ART

In various facilities such as factories, leaked liquid way cause disasters or damage the facilities themselves, whereby it is necessary to detect the occurrence of leaked liquid at its early stage.

To this aim, there have conventionally been proposed various kinds of optical means which can detect whether leaked liquid have occurred or not. For example, a leak sensor using a filter made of thin paper or the like has been proposed.

This leak sensor emits light to the filter and detects the change in quantity of transmitted light or reflected light in the case where the filter is impregnated with a liquid, thereby determining whether a leaked liquid has occurred or not.

When a highly viscous liquid is subjected t o detection, however, the liquid is hard to infiltrate into the filter, thus making it difficult for the leak sensor using the filter to accurately grasp the change in light quantity, whereby leaked liquid is very hard to detect.

Also, since the filter has to be replaced upon every resetting operation, operators may suffer unexpected disasters upon replacing the filter when a highly dangerous liquid is subjected to detection, unless much attention is paid. Due to inconveniences as such, this kind of leak sensor has not been suitable for practical use.

Therefore, leak sensors using a light-transmitting part constituted by a transparent or semitransparent material in place of the filter made of thin paper or the like have been proposed.

In these leak sensors, for example, a casing is constructed by a transparent or semitransparent glass material, synthetic resin, or the like, while the bottom part thereof or the like is provided with the above-mentioned light-transmitting part.

For example, such a leak sensor utilizes the fact that, when probe light is incident from a medium having a refractive index n1 onto a medium having a refractive index n2 (n1>n2 ), the reflectivity of probe light remarkably changes near its angle of reflection.

Namely, when no leaked liquid occurs, the difference in refractive index between the casing and the light-transmitting part is so large that the probe light having propagated through the casing is mostly reflected by the light-transmitting part and then propagates as reflected light.

If a leaked liquid adheres to the light-transmitting part, on the other hand, then the difference in refractive index between the casing and the light-transmitting part becomes smaller, so that the reflectivity at the boundary between the casing and the light-transmitting part lowers, whereby part of the probe light spills into the leaked liquid, by which the quantity of propagating reflected light decreases.

When a leak sensor employing the light-transmitting part as such is used, whether a leaked liquid has occurred or not can be detected while avoiding the shortcomings of the leak sensor using the filter.

Meanwhile, there are cases where the occurrence of a leaked liquid cannot be detected favorably if a casing is installed as it is in a subject of leak detection.

Namely, while the leak sensor cannot detect a leaked liquid unless it reaches substantially the center part thereof, i.e., a location under the light-transmitting part, if the casing is installed as it is in the subject of leak detection, then the light-transmitting part may attach to the region subjected to leak detection without substantially forming a space therebetween, thus making it hard for the leaked liquid to reach the location under the light-transmitting part.

Also, even when the leak sensor is held so as to form a space from the subjected of leak detection, if the manner of holding is unfavorable, e.g., in a state where the leak sensor is installed such that the light-transmitting part is inclined with respect to the subject of leak detection or the leak sensor is shaky, then the leaked liquid cannot be detected stably.

On the other hand, if the leak sensor is held with a large contact area or too much force so as not to become shaky, the leaked liquid cannot be detected accurately, because of the fact that the light-transmitting part is hidden, distortions and the like occur, and so forth.

SUMMARY OF THE INVENTION

In view of the above-mentioned problems of the prior art, it is an object of the present invention to provide a leak sensor which improves the shortcomings of the above-mentioned optical sensor and can accurately detect leaked liquid.

For achieving the above-mentioned object, the present invention provides a leak sensor including a light-transmitting part constituted by a transparent or semitransparent material, the leak sensor irradiating the light-transmitting part with probe light in a state where the light-transmitting part is provided so as to face into a region subjected to leak detection, and detecting a leaked liquid according to a change in quantity of light reflected by a boundary between the light-transmitting part and the region subjected to leak detection;

the leak sensor further comprising attachment means for installing the leak sensor in the region subjected to leak detection, the attachment means comprising a ground portion and a mounting portion.

Here, the ground portion is grounded on the region subjected to leak detection.

The mounting portion rises from the ground portion, and is adapted to mount the leak sensor in a state where the light-transmitting part is parallel to the ground portion and in a state where a predetermined space is formed therebetween.

Preferably, in the present invention, a surface of the ground portion opposing the light-transmitting part is subjected to a surface treatment for reducing a surface tension of the leaked liquid on the ground portion.

Preferably, the present invention further comprises a conduit portion formed in the ground portion so as to guide the leaked liquid to substantially a center part between the light-transmitting part and the ground portion.

Preferably, the present invention further comprises an electric system, an optical system, a casing, and a connection line, the optical system being provided in the casing and installed within the region subjected to leak detection, the electric system being installed at a place separated from the region subjected to leak detection, the optical system and the electric system being connected to each other by the connection line.

Here, the electric system generates probe light for irradiating the light-transmitting part, photoelectrically converts the light reflected by the boundary between the light-transmitting part and the region subjected to leak detection, and detects the leaked liquid according to a change in an output thereof.

The optical system includes the light-transmitting part, irradiates the light-transmitting part with the probe light from the electric system, and collects the light reflected from the light-transmitting part.

The casing is provided with the optical system such that the light-transmitting part is directed to the region subjected to leak detection, while not being provided with the electric system.

The connection line connects the optical system provided in the casing and the electric system to each other, guides the probe light obtained by the electric system to the optical system, and guides to the electric system the reflected light from the light-transmitting part obtained by the optical system.

Preferably, the connection line is an optical fiber comprising an entrance-side fiber and an exit-side fiber.

Here, the entrance-side fiber guides the probe light from the electric system and has an irradiating portion for emitting the light toward the light-transmitting part.

The exit-side fiber has a light-collecting portion for collecting the reflected light from the light-transmitting part and guides the light from the light-collecting portion to the electric system.

Preferably, in the light-transmitting part in the present invention, a boundary surface with respect to the region subjected to leak detection or a surface for inputting and outputting the probe light is formed with an irregularity portion.

Preferably, in the present invention, the irregularity portion is a sawtooth irregularity portion having a sectional form comprising an isosceles triangle with a vertical angle of 90°.

Preferably, the present invention further comprises a holding member adapted to hold, in a state installed within the casing above the light-transmitting part, at least the irradiating portion of the entrance-side fiber and the light-collecting portion of the exit-side fiber such that the irradiating portion and the light-collecting portion form a predetermined angle with respect to the light-transmitting part.

Preferably, the present invention further comprises a transparent or semitransparent triangular prism provided within the casing above the light-transmitting part; the prism refracting the probe light incident thereon from the irradiating portion of the entrance-side fiber such that the probe light is incident on the light-transmitting part, and refracting the reflected light incident thereon from the light-transmitting part such that the reflected light is incident on the light-collecting portion of the exit-side fiber;

the irradiating portion of the entrance-side fiber and the light-collecting portion of the exit-side fiber being provided above the prism.

Preferably, the present invention further comprises a transparent or semitransparent triangular prism within said casing in a state where bottom portion of said prism as said light-transmitting part is faced into a region subjected to leak detection, and having a refractive index substantially identical to the refractive index of the leaked liquid;

the irradiating portion of the entrance-side fiber and the light-collecting portion of the exit-side fiber being provided above the prism within the casing;

the prism refracting the probe light incident thereon from the irradiating portion of the entrance-side fiber such that the probe light is incident on the bottom portion thereof, and refracting the reflected light incident thereon from the bottom portion thereof such that the reflected light is emitted to the light-collecting portion of the exit-side fiber.

Preferably, in the present invention, the casing further comprises a connection line drawing portion and a cap.

Here, the connection line drawing portion is provided with an opening through which the connection line can be inserted.

Also, the cap is provided with an inner peripheral portion which, while being attached to the connection line drawing portion, can press an outer peripheral portion of thus attached part of the connection line drawing portion toward a center axis thereof.

DETAILED DESCRIPTION OF THE PREFERRED EMBODIMENT

In the following, preferred embodiments of the present invention will be explained with reference to the drawings.

Figure 1:
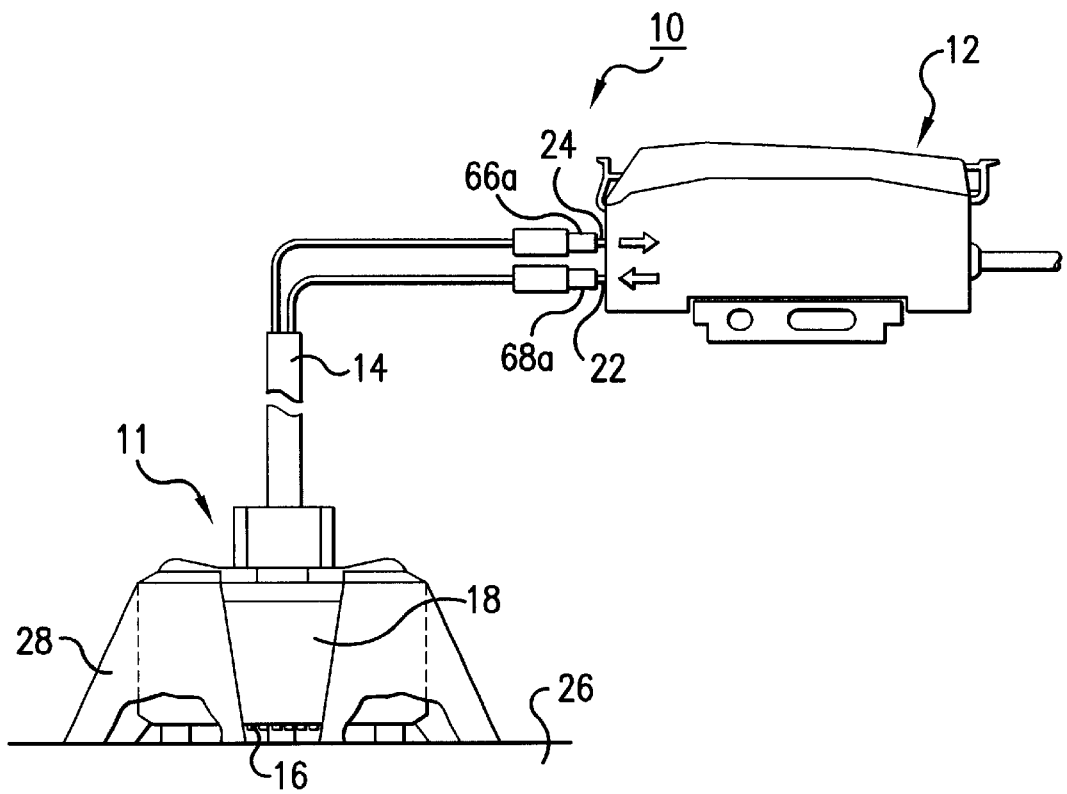
FIG. 1 is an example of connections of the leak sensor in accordance with the present invention.

FIG. 1 shows an example of connections of the leak sensor in accordance with the present invention.

In this drawing, the leak sensor 10 comprises an optical system 11 and an amplifier (electric system) 12, whereas the optical system 11 and the amplifier 12 are connected to each other by an optical fiber (connection line) 14.

The leak sensor 10 includes a casing 18 constituted by a transparent or semitransparent material, e.g., glass, synthetic resin, or the like; and a light-transmitting part 16 provided at the outer surface of the casing 18 and constituted by a transparent or semitransparent material, e.g., glass, synthetic resin, or the like.

The amplifier 12 contains an electric system, e.g., electric circuits such as a light-transmitting circuit, a light-receiving circuit, and a signal processing circuit, electric devices (not depicted), and the like.

The casing 18 contains the optical fiber 14 halfway from one end portion thereof, whereas the other end portions 66a, 68a thereof are connected to connectors 22, 24 of the amplifier 12, respectively, so as to be freely inserted therein and removed therefrom.

The casing 18 is secured to a region subjected to leak detection 26 with an attachment 28 in a state where the light-transmitting part 16 opposes the region subjected to leak detection 26.

On the other hand, the amplifier 12 is placed at a location separated from the region subjected to leak detection 26, whereas probe light and its reflected light from the light-transmitting part 16 are guided by way of the optical fiber 14 between the amplifier 12 and the casing 18 provided at the region subjected to leak detection 26.

Thus, in this embodiment, the electric system is not contained within the casing 18 installed in the region subjected to leak detection 26, but provided in the amplifier 12 placed at a location separated from the region subjected to leak detection 26.

Since the casing 18 and the amplifier 12 are connected to each other by the optical fiber 14, short circuit is securely prevented from occurring in the electric system even when the leak sensor 10 is provided in an explosion-proof area. Also, the possibility of flammable gases generated in the atmosphere in the region subjected to leak detection 26 causing a disaster with a spark generated from the electric system or the like by some reason can completely be eliminated.

Also, since the other end portions of the optical fiber connected to the casing 18 are configured so as to be removable from the amplifier 12, even if damages or failures occur in the casing 18 or the optical system 11 provided in the casing 18, for example, the amplifier 12 can be utilized as it is as long as no abnormality occurs therein, and it will be sufficient if only the casing 18 including the optical fiber 14 is replaced. Consequently, as compared with the case where normal parts such as the amplifier 12 are also replaced, the cost can be made quite lower.

Also, when the optical fiber 14 is used, probe light and its reflected light can efficiently be guided between the casing 18 and the amplifier 12 without any loss while being guided.

Since the optical fiber 14 can freely change the optical path between the casing 18 and the amplifier 12, places where the optical system 11 and amplifier 12 are installed can be changed freely.

Attachment

Meanwhile, if the casing 18 is installed as it is in the subject of leak detection 26, then the occurrence of a leaked liquid may not favorably be detected.

Namely, while the leak sensor cannot detect a leaked liquid unless it reaches substantially the center part under the casing 18, i.e., a location under the light-transmitting part 16, if the casing 18 is installed as it is in the subject of leak detection 26, then the light-transmitting part 16 may attach to the region subjected of leak detection 26 without substantially forming a space therebetween, thus making it hard for the leaked liquid to reach the location under the light-transmitting part 16.

Also, even when the casing 18 is held so as to form a space from the subject of leak detection 26, if the manner of holding is unfavorable, e.g., in a state where the casing 18 is installed such that the light-transmitting part 16 is inclined with respect to the subject of leak detection or the casing 18 is shaky, then the leaked liquid cannot be detected stably. On the other hand, if the casing 18 is held with a large contact area or too much force so as not to become shaky, then the leaked liquid cannot be detected accurately because of the fact that the light-transmitting part 16 is hidden, distortions and the like occur, and so forth.

Therefore, in this embodiment, the casing 18 is secured to the region subjected to leak detection 26 with the attachment (attachment means) 28 in a state where the light-transmitting part opposes the region subjected to leak detection 26.

Figure 2:
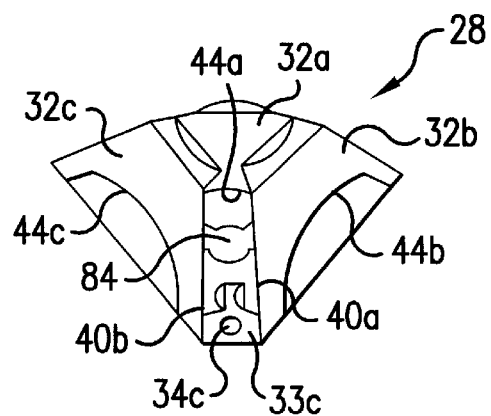
FIG. 2 is a perspective view of the attachment means favorably used in the leak sensor of the present invention.
Figure 3:
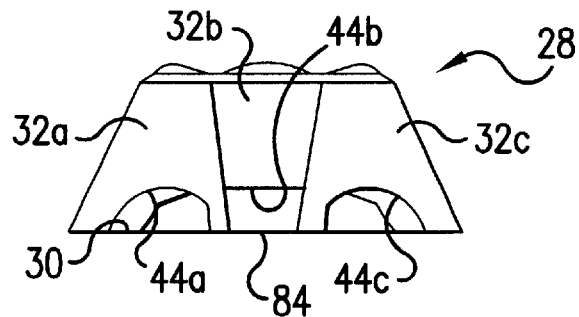
FIG. 3 is a view of the same seen from a side thereof.
Figure 4:
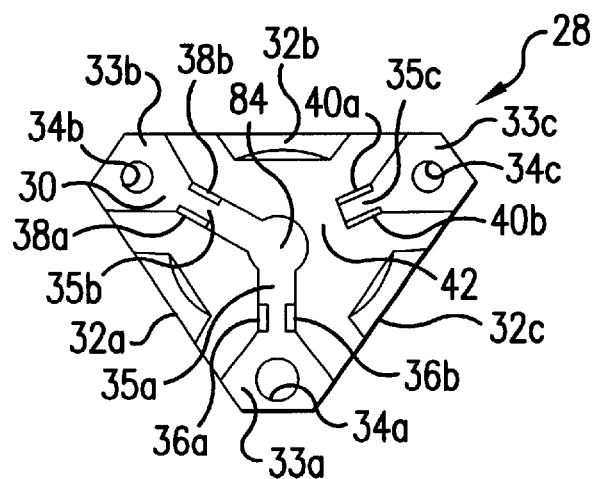
FIG. 4 is a view of the same seen from thereabove.
Figure 5A:
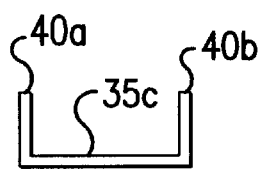
FIG. 5A and 5B are views of mounting portions of the attachment shown in FIG. 4.
Figure 5B:
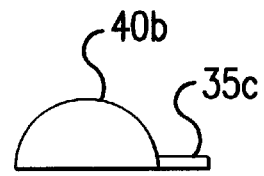
Figure 6:
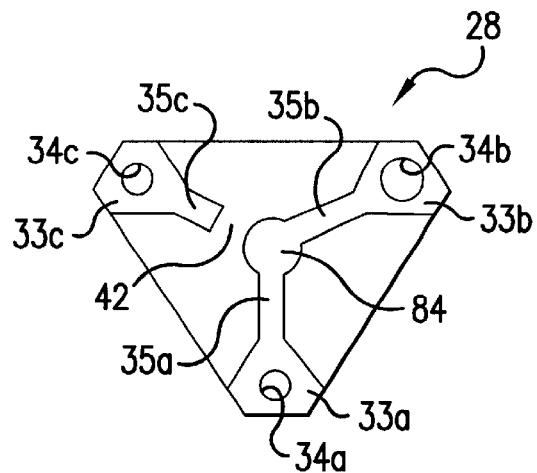
FIG. 6 is a view of the attachment seen from thereunder.

FIGS. 2 to 6 show schematic configurations of the attachment. Here, FIG. 2 is a perspective view of the attachment; FIG. 3 is a view of the same seen from a side thereof; FIG. 4 is a view of the same seen from thereabove; FIG. 5A is a view of mounting portions of the attachment shown in FIG. 4 as seen in the direction of i therein; FIG. 5B is a view of the mounting portions of the attachment shown in FIG. 4 as seen in the direction of j therein; and FIG. 6 is a view of the attachment seen from thereunder.

In these drawings, the attachment 28 comprises a bottom portion (ground portion) 30, and side portions 32a, 32b, 32c rising from the outer periphery of the bottom portion 30. Their metal surfaces are subjected to a passivating treatment so as to form an insoluble ultrathin film thereon, by which it is less likely to be corroded by the leaked liquid.

The bottom portion 30 is formed by a substantially circular near center part 84 opposing the light-transmitting part 16 in a state where the casing 18 is mounted, and three corner parts 33a, 33b, 33c.

Sides of the near center part 84 are connected to two intermediate parts 35a, 35b extending from two corner parts 33a, 33b among the three corner parts.

The remaining corner part 33c is formed with one intermediate part 35c extending toward the near center part 84 but being formed with a cutout on its way without connecting with the near center part 84. Thus formed cutout is used as a conduit portion 42 which will be explained later.

Corner parts 33a, 33b, 33c of the bottom portion 30 are provided with their respective attachment holes 34a, 34b, 34c, through which screws (not depicted) and the like are inserted, so as to firmly secure the attachment 28 to the region subjected to leak detection.

The bottom portion 30 is provided with mounting portions 36a, 36b; 38a, 38b; 40a, 40b which rise from the individual intermediate parts 35a, 35b, 35c with a predetermined height and can mount the casing 18 in a state where the light-transmitting part 16 is parallel to the bottom portion 30 and in a state where a predetermined space is formed therebetween.

The mounting portions 36a, 36b; 38a, 38b; 40a, 40b are each formed semicircular and support the lower part of the casing 18 point by point.

The side portions 32a, 32b, 32c hold the sides of the casing 18 while in a state where the casing 18 is mounted on the mounting portions 36a, 36b; 38a, 38b; 40a, 40b.

Thus, in the leak sensor 10, the lower part of the casing is point-supported by the attachment 28 while in a state parallel to the subject of leak detection 26 with a predetermined space therebetween. Also, the sides of the casing are uniformly held from three directions. Further, while in a state where the casing is installed, the near center part 84 of the bottom portion 30 of the attachment 28 is provided at a portion opposing the light-transmitting part 16.

Also, the bottom portion 30 is formed with the conduit portion 42 as mentioned above.

The conduit portion 42 guides the leaked liquid to substantially the center portion of the light-transmitting part 16.

Also, the upper face of the bottom portion 30 is subjected to a roughing treatment for forming very minute irregularity portions and the like, i.e., a surface treatment for weakening the surface tension of leaked liquid.

Due to such a surface treatment, the leaked liquid is smoothly moved without remaining on the bottom portion 30, so as to be guided to substantially the center portion of the light-transmitting part of the casing.

The side parts 32a, 32b, 32c are formed with openings 44a, 44b, 44c, respectively, near the bottom portion, so that the leaked liquid is likely to enter the near center portion under the light-transmitting part from the outside of the casing.

Namely, the conduit portion 42 formed in the bottom portion 30 of the attachment means 28, the surface treatment formed on the bottom portion 30 for weakening the surface tension of leaked liquid, and the openings 44a, 44b, 44c formed in the side parts 32a, 32b, 32c make the leaked liquid smoothly movable to substantially the center portion of the light-transmitting part of the casing.

Since the lower part of the casing 18 is point-supported by the attachment 28 as such, the leak sensor 10 is advantageous in that it can be held by a small area, distortions and the like are less likely to occur, and so forth. Also, since the sides of the casing are uniformly held by the side parts 32a, 32b, 32c from three directions, the casing can be held firmly without generating distortions and the like.

Further, since the bottom portion 30 of the attachment 38 is provided with the near center part 84 opposing the light-transmitting part 16, influences of brightness and darkness, coloration, and the like in the region subjected to leak detection in the absence of leaked liquid can be reduced greatly when the casing is installed in the region subjected to detection.

Namely, even if the region subjected to leak detection for installing the casing is changed, the light-transmitting part 16 always opposes the near center part 84 of the bottom portion 30 of the attachment 28, whereby the detecting environment can be kept substantially the same. As a consequence, the quantity of reflected light reaching the light-receiving circuit when no leaked liquid occurs can be made more constant, whereby changes in light quantity upon occurrences of leaked liquid can be detected more accurately.

Figure 7A:
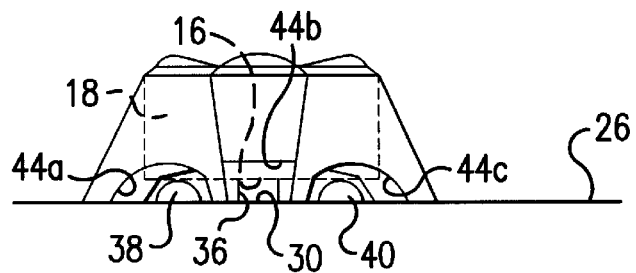
FIGS. 7A and 7B are explanatory views for operations of the attachment means shown in FIGS. 2 to 6.
Figure 7B:
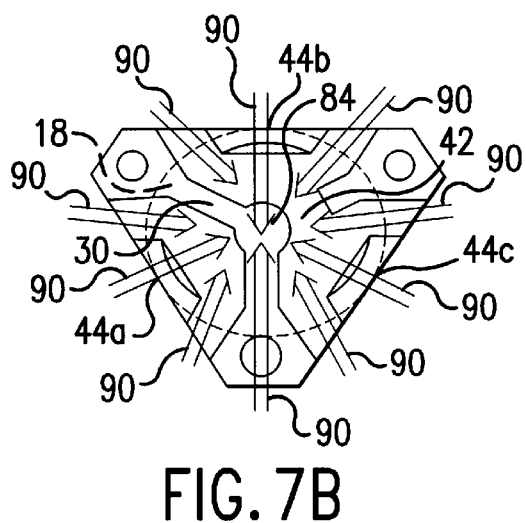

Also, as can be seen from the side view of the attachment 28 shown in FIG. 7A and the top plan view of the attachment 28 shown in FIG. 7B, the casing 18 of the leak sensor 10 is held parallel to the region subjected to leak detection 26 with a predetermined space formed therebetween by the mounting portions 36, 38, 40 of the attachment 28.

Since the bottom portion 30 is formed with the conduit portion 42, while the upper face of the bottom portion 30 is subjected to a surface treatment for weakening the surface tension of a leaked liquid 90, with the side parts 32a, 32b, 32c being formed with their respective openings 44a, 44b, 44c, the leaked liquid 90 can smoothly move to an area between substantially the center portion of the light-transmitting part of the casing 18 and the near center part 84 of the bottom face 30 of the attachment 28, whereby the occurrence of leaked liquid can be detected quickly.

Inside of Leak sensor

Figure 8:
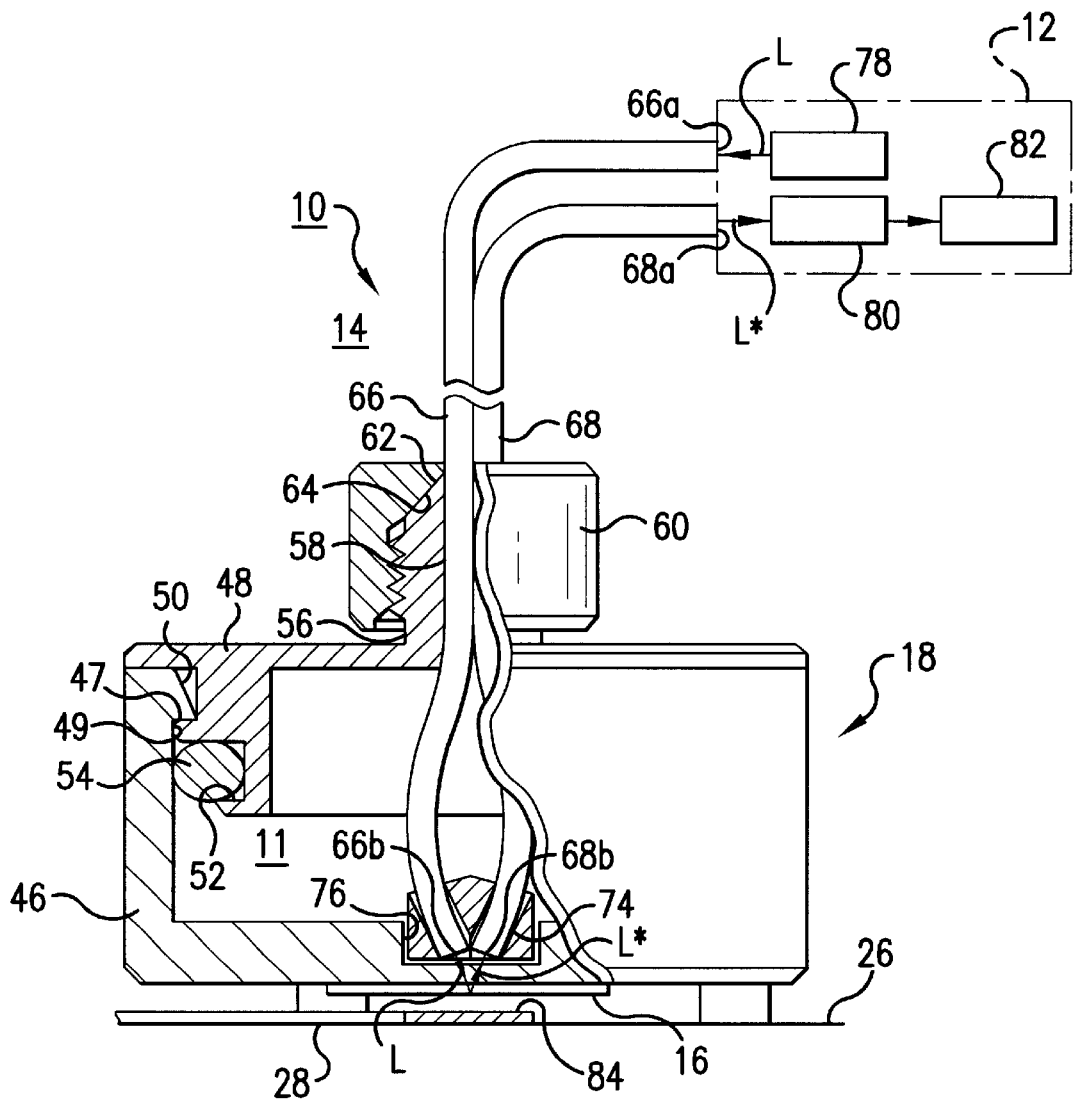
FIG. 8 is a partly broken view showing an outline of the leak sensor in accordance with a first embodiment of the present invention.
Figure 9:
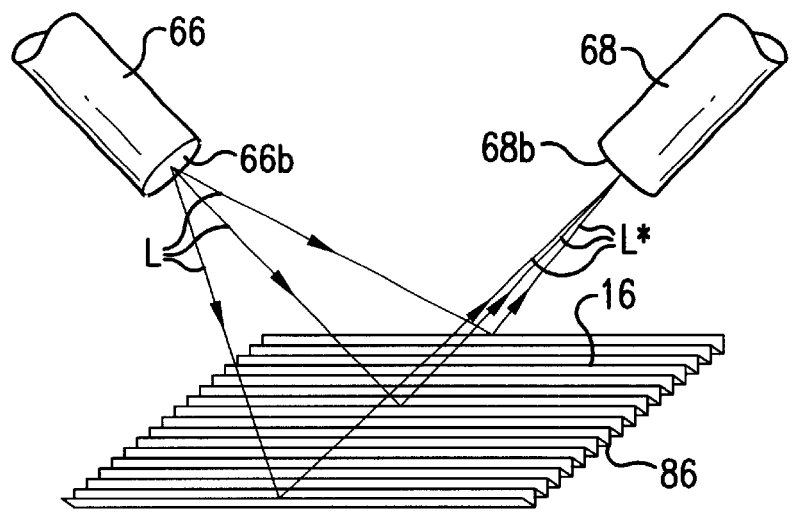
FIG. 9 is an explanatory view of the connection lines and light-transmitting part of the leak sensor shown in FIG. 8.

FIG. 8 is a partly broken view showing an outline of the leak sensor in accordance with an embodiment of the present invention, whereas FIG. 9 is an enlarged view of the vicinity of the light-transmitting part of the leak sensor shown in FIG. 8.

In these drawings, the leak sensor 10 includes a box-shaped or tubular casing 18, whereas the casing 18 includes a body 46 and a lid 48.

The upper part of the casing body 46 is provided with an opening 50, whereas the lid 48 is fitted to the opening 50.

The inner peripheral wall of the casing body 46 is provided with a protrusion 47, whereas the outer peripheral wall of the lid 48 is provided with a protrusion 49. These protrusions 47, 49 engage each other.

The lid 48 is provided with a groove 52, in which an O ring 54 made of an elastic material is provided so as to keep a hermetic state between the casing body 46 and the lid 48.

Also, the lid 48 is provided with a connection line drawing portion 56 projecting from substantially the center part of its base portion. The connection line drawing portion 56 is provided with an opening 58 for inserting the optical fiber 14 therethrough. A cap 60 is screwed onto the connection line drawing portion 56 from thereabove.

Here, the outer peripheral wall of the connection line drawing portion 56 is formed with a tapered part 62, whereas the cap 60 is provided with an inner peripheral wall 64 which, while being attached to the connection line drawing portion 56, can press the outer peripheral wall of the connection line drawing portion, the tapered part 62 in particular, toward the center axis, i.e., toward the connection line. As a consequence, the space is kept from occurring between the opening 58 provided in the connection line drawing portion 56 of the lid 48 and the optical fiber 14, whereby the lid 48 and the cap 60 maintains a hermetic state therebetween.

When the casing 18 of the leak sensor 10 in accordance with the present invention is configured as such, it can be made smaller with a simpler configuration, whereby parts which are likely to be eroded with the leaked liquid can be reduced. This configuration is advantageous in that, even if the side wall forming the casing is made relatively thick in order to secure strength or reduce or retard the heat of leaked liquid being transmitted to the inside, the leaked liquid detection is less likely to be inhibited thereby as long as attention is paid to the thickness of the light-transmitting part 16.

Preferably, in this embodiment, the casing 18 is formed vertically long, so that, even if a leaked liquid occurs, it will not reach the upper part of the casing 18.

As a consequence, the leak sensor 10 of the present invention can be operated normally at least until the fact that a leaked liquid has occurred is reported to the outside.

Thus constructed hermetic casing 18 is provided with an optical system. For example, the outer face of the bottom portion of the casing 18 is provided with the light-transmitting part 16, whereas the optical fiber 14 is contained within the casing 18 halfway from one end portion thereof.

The light-transmitting part 16 is constituted by glass or a synthetic resin, so as to be semitransparent, for example, such that the reflectivity of probe light L varies depending on whether a leaked liquid is in contact therewith or not, and is provided such that an irregularity portion 86 opposes the region subjected to leak detection 26.

The optical fiber 14 is constituted by a material excellent in heat resistance, for example, such as silica, synthetic silica, and the like, and comprises an entrance-side fiber 66 and an exit-side fiber 68.

An irradiating portion 66b of the entrance-side fiber 66 which is one end portion of the optical fiber and a light-collecting portion 68b of the exit-side fiber 68 are held by a holding member 74, constituted by a transparent material, having a heat resistance. As the holding member 74 is simply installed in a recess 76 of the bottom portion of the casing body 46, constituted by a transparent material, having a heat resistance as with the holding member 74, each of the irradiating portion 66b and the light-collecting portion 68b forms a predetermined angle with respect to the light-transmitting part 16.

The amplifier 12 includes a light-emitting circuit 78, a light-receiving circuit 80, and a signal processing circuit 82.

The light-emitting circuit 78 emits the probe light L, whereas thus emitted probe light L is made incident on the other end portion 66a of the entrance-side fiber 66 and is guided by way of the fiber 66 to the irradiating portion 66b, from which it irradiates the light-transmitting part 16.

The other end portion 68a of the exit-side fiber 68 is connected to the light-receiving circuit 80. The reflected light L* collected by the light-collecting portion 68b at one end portion and guided by the exit-side fiber 68 is received and photoelectrically converted by the light-receiving circuit 80.

According to the change in signal strength detected by the light-receiving circuit 80, the signal processing circuit 82 determines whether there is a leaked liquid or not.

The leak sensor 10 is constructed as such, so as to detect the change in quantity of reflected light L* reaching the light-receiving circuit 80.

Also, according to the change in quantity of reflected light L* guided to the light-receiving circuit 80, the signal processing circuit 82 determines whether a leaked liquid has occurred or not.

Namely, if a decrease in light quantity exceeding a predetermined permissible range with reference to a state where no leaked liquid occurs is seen, then the signal processing circuit 82 determines that the leaked liquid occurs.

If there is no change in the light quantity or the change in light quantity is within the predetermined permissible range, on the other hand, then the signal processing circuit 82 determines that there is not leaked liquid occurring. If it is determined that a leaked liquid occurs, then the signal processing circuit 82 can report it to the outside by an alarm display, buzzer, and the like.

Also, since the near center part 84 of the bottom portion of the attachment 28 is provided at a portion opposing the light-transmitting part 16 of the casing 18 in parallel therewith, influences of brightness and darkness, coloration, and the like in the region subjected to leak detection 26 in the absence of leaked liquid can be reduced greatly when the casing 18 is installed in the region subjected to leak detection 26.

Namely, even if the region subjected to leak detection is changed, the light-transmitting part 16 always opposes the near center part 84 of the bottom portion 30 of the attachment 28 in parallel therewith, whereby the detecting environment can be kept substantially the same. As a consequence, the quantity of reflected light reaching the light-transmitting part when no leaked liquid occurs can be made more constant, whereby changes in light quantity upon occurrences of leaked liquid can be detected more accurately.

Thus, in this embodiment, as mentioned above, the electric system such as electric circuits and electric devices are not provided within the casing 18 placed in the region subjected to leak detection, whereas the electric circuits are contained in the amplifier 12 and are provided at a place separated from the region subjected to leak detection.

As a result, flammable leaked liquid in the region subjected to leak detection and flammable gases in the atmosphere of the region subjected to leak detection can reliably be prevented from being ignited with sparks from the electric circuits, electric devices, and the like.

Also, since the O ring 54, lid 48, and cap 60 such as those mentioned above keep the inside of the casing of the leak sensor 10 hermetic, the infiltration of leaked liquid into the casing is reduced greatly, whereby the influence of leaked liquid upon the optical system can be lowered greatly.

Further, since an optical fiber constituted by a material excellent in heat resistance such as silica or synthetic silica, for example, is used for the entrance-side fiber 66 and exit-side fiber 68 connecting the amplifier 12 and the leak sensor 10 to each other, adverse effects of heat can be reduced greatly.

The angle of incidence of probe light L upon the light-transmitting part 16 and the converging angle of reflected light L* from the light-transmitting part 16 are very important. It will be quite troublesome if the irradiating portion 66b of the entrance-side fiber 66 and the light-collecting portion 68b of the exit-side fiber 68 are positioned with respect to the light-transmitting part 16 each time the optical fiber is replaced. When the holding member 74 and recess 76 such as those mentioned above are provided, then the setting of the irradiating angle of probe light with respect to the light-transmitting part 16 and of the converging angle of reflected light from the light-transmitting part can automatically be effected with a predetermined angle if only the optical fiber 14 provided with the holding member 74 is provided in the recess 76, whereby replacing operations become easier.

Also, in this embodiment, since the holding member 74 is constituted by a material having a heat resistance, even if a leaked liquid enters the casing, it will not directly come into contact with the irradiating portion 66b and light-collecting portion 68b, whereby the influence of the leaked liquid upon the irradiating portion and light-collecting portion can be retarded greatly.

Here, it will be sufficient for the holding member to protect the vicinity of the irradiating portion and light-collecting portion such that the leak sensor operates normally at least until the occurrence of leaked liquid is reported to the outside, whereby a very simple configuration can be used. As a consequence, the leak sensor can be made smaller with a lighter weight, and so forth.

Meanwhile, if the light-transmitting part 16 is formed flat, then it will be more likely to be influenced by brightness and darkness, coloration, and the like in the region subjected to leak detection in the absence of leaked liquid. As a consequence, the quantity of light received by the light-receiving means when no leaked liquid occurs becomes inconstant, so that the change in light quantity upon the occurrence of leaked liquid may not be seen accurately.

When an optical fiber constituted by a material excellent in heat resistance such as silica is used for the connection line, the irradiating portion and light-collecting portion are often provided on substantially the same plane that is substantially orthogonal to the light-transmitting part, since the optical fiber is inferior in flexibility.

In this case, the optical axis of reflected light from the light-transmitting part caused by probe light would be positioned on the incident optical axis of probe light, whereby it becomes very difficult for the reflected light to be incident on the light-collecting portion.

Therefore, in order to reduce the influence of brightness and darkness, coloration, and the like of the region subjected to leak detection when no leaked liquid occurs, and in order for the reflected light from the light-transmitting part to be favorably incident on the light-collecting portion even when the irradiating portion of the entrance-side fiber and the light-collecting portion of the exit-side fiber are provided on substantially the same plane, the outer face of the light-transmitting part is provided with an irregularity portion, for example.

Figure 10:
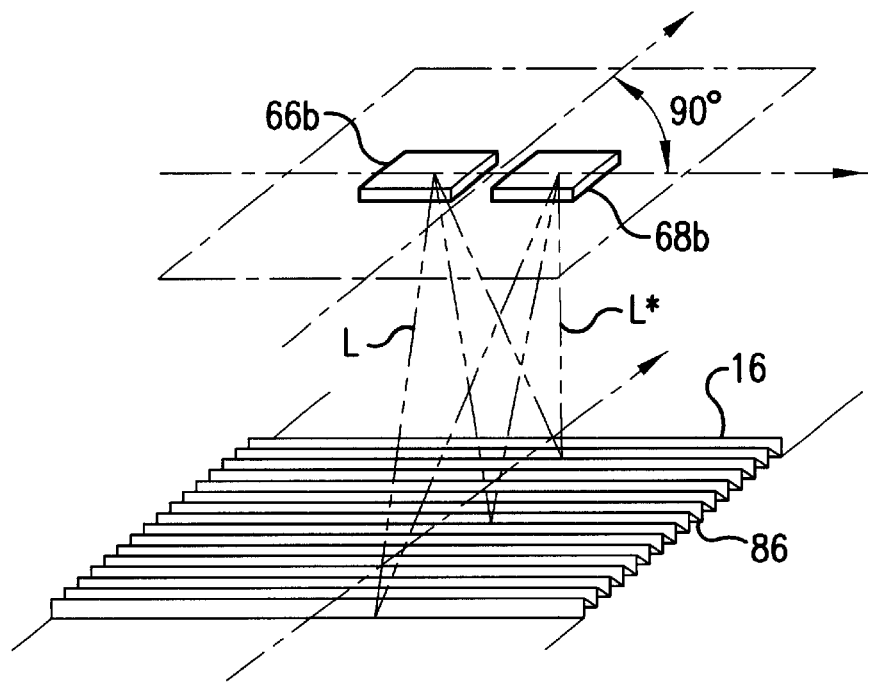
FIG. 10 is an explanatory view of a light-transmitting part which is favorably used in particular when the tip portions of the connection lines shown in FIG. 9 are provided on the same plane.

As shown in FIG. 10, in the case where the irradiating portion 66b of the entrance-side fiber and the light-collecting portion 68b of the exit-side fiber are provided on substantially the same plane, the outer face of the light-transmitting part 16, i.e., the lower face adapted to come into contact with the leaked liquid is inscribed with a plurality of sawtooth irregularity portions 86, each having a sectional form comprising an isosceles triangle with a vertical angle of 90°, aligning sidewise in parallel.

Figure 11:
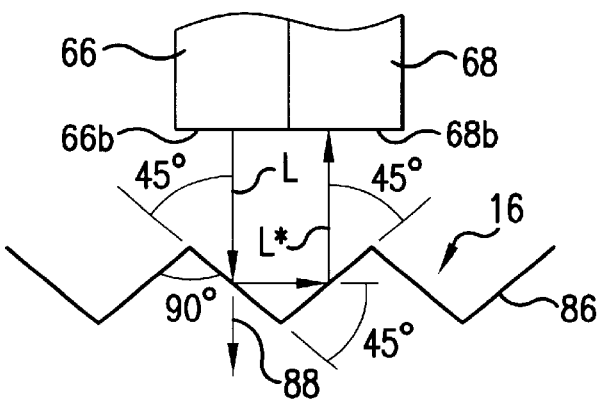
FIG. 11 is an explanatory view of operations of the light-transmitting part shown in FIG. 9 when no leaked liquid occurs.

As a consequence, when probe light L from the irradiating portion 66b is incident on an irregularity portion 86 at an angle of incidence of 45° C as shown in FIG. 11, then the probe light L is reflected thereby to its neighboring irregularity portion. Thus reflected light L* is reflected by the latter irregularity portion with an angle of emission of 45°, so that the reflected optical axis of probe light shifts substantially parallel to the incident optical axis, whereby the reflected light L* would favorably be made incident on the light-collecting portion 68b.

Figure 12:
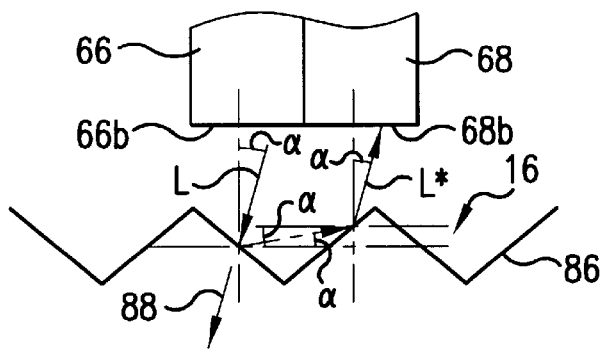
FIG. 12 is an explanatory view of operations of the light-transmitting part shown in FIG. 9 when no leaked liquid occurs.

On the other hand, as shown in FIG. 12, even when the probe light L from the irradiating portion 66b is incident on an irregularity portion 86 at an angle of incidence of 45°+α, it will be reflected thereby at an angle of α to an irregularity portion next thereto. Thus reflected light L* is reflected by the latter irregularity portion at an angle of emission of 45°+α, so that the reflected optical axis of probe light shifts substantially parallel to the incident optical axis, whereby the reflected light L* would favorably be made incident on the light-collecting portion 68b.

Thus, even in the case where the irradiating portion 66b of the entrance-side fiber and the light-collecting portion 68b of the exit-side fiber are provided on substantially the same plane as in the case where an optical fiber excellent in heat resistance but slightly inferior in flexibility is employed as mentioned above, the optical axis of incident light L and the optical axis of reflected light L* will shift from each other substantially in parallel regardless of the angle of incidence of probe light L onto the irregularity portions 86 if the outer face of the light-transmitting part 16 is inscribed with a plurality of sawtooth irregularity portions 86, each having a sectional form comprising an isosceles triangle with a vertical angle of 90°, aligning sidewise in parallel, for example.

Figure 13:
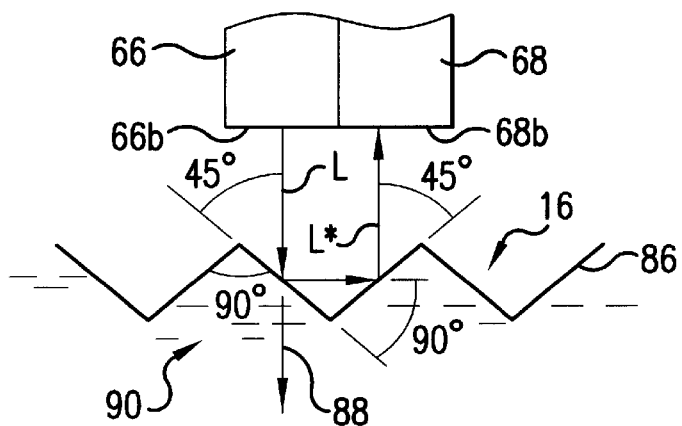
FIG. 13 is an explanatory view of operations of the light-transmitting part shown in FIG. 9 when a leaked liquid occurs.
Figure 14:
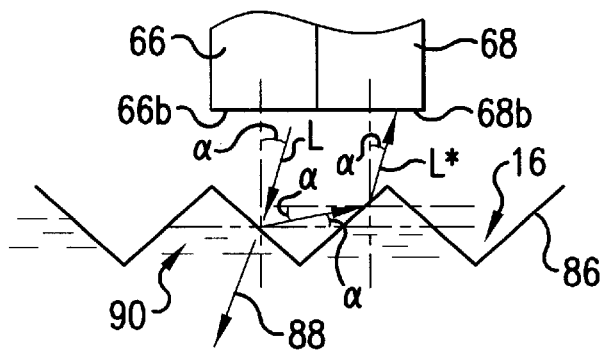
FIG. 14 is an explanatory views of operations of the light-transmitting part shown in FIG. 9 when a leaked liquid occurs.

If a leaked liquid occurs, on the other hand, whether probe light L from the irradiating portion 66b is incident on the irregularity portion 86 at an angle of incidence of 45° as shown in FIG. 13 or at an angle of 45°+α as shown in FIG. 14, the difference in refractive index with respect to that in the light-transmitting part 16 becomes smaller, whereby the ratio of probe light L transmitted through the irregularity portion 86 as it is as leakage light 88 becomes greater, by which the quantity of reflected light L* decreases.

Therefore, even when the irradiating portion 66b of the entrance-side fiber 66 and the light-collecting portion 68b of the exit-side fiber 68 are provided on substantially the same plane, whether the leaked liquid 90 has occurred or not can be detected accurately.

Also, when the irregularity portions 86 are formed like sawteeth each having a sectional form comprising an isosceles triangle with a vertical angle of 90°, the incident optical axis of probe light and its reflected optical axis can be shifted substantially in parallel, whereby it becomes very easy to set the angles of incidence and reflection of probe light to desirable angles.

Figure 15:
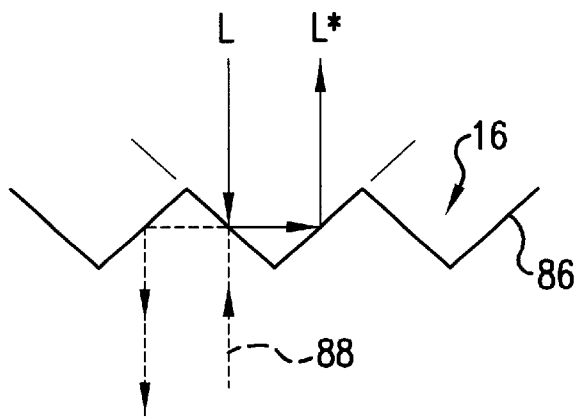
FIG. 15 is an explanatory view of other operations and effects of the light-transmitting part shown in FIG. 10.
Figure 16:
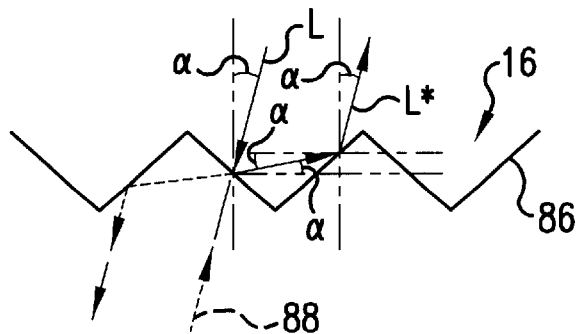
FIG. 16 is an explanatory view of other operations and effects of the light-transmitting part shown in FIG. 10.

As mentioned above, since the incident optical axis of probe light L and its reflected optical axis shift from each other substantially in parallel, the difference in refractive index from that in the light-transmitting part is greater when no leaked liquid occurs. Also, the light-transmitting part is provided with irregularity portions. Therefore, whether the probe light L is incident on the irregularity portions at an angle of incidence of 45° as shown in FIG. 15 or at an angle of incidence of 45°+60 as shown in FIG. 16, even when the leakage light 88 to the outside caused by the probe light L is reflected by the region subjected to leak detection so as to return to the irregularity portions 86 and enter the light-transmitting part 16, such light is mostly reflected to the outside by the irregularity portions.

Also, when the leakage light 88 to the outside caused by the probe light L is reflected by the region subjected to leak detection and thereby returns to the irregularity portions 86 and even enters the light-transmitting part 16, the optical axis of leakage light 88 can reliably be prevented from intersecting the optical axis of the reflected light L* collected by the light-collecting portion 68b.

As a consequence, the irregularity portions 86 provided in the light-transmitting part 16, for example, on the outer face thereof can greatly reduce influences of brightness and darkness, coloration, and the like in the object subjected to leak detection in the absence of leaked liquid, so that the quantity of reflected light reaching the light-receiving means when no leaked liquid occurs can be made more constant, whereby the change in quantity of light when a leaked liquid occurs can be detected more accurately.

Also, the synergy between the light-transmitting part 16 of the casing 18 and the near center part of the attachment provided so as to oppose it greatly reduces influences of brightness and darkness, coloration, and the like in the region subjected to leak detection in the absence of leaked liquid.

Further, since the irregularity portions 86 are provided on the outer face of the light-transmitting part 16, the liquid subjected to detection is independent of whether its viscosity is high or low, whereby liquids having any viscosity can be detected.

The foregoing configuration relates to an example in which the irregularity portions 86 provided in the light-transmitting part 16 employ those in a sawtooth shape having a sectional form comprising an isosceles triangle with a vertical angle of 90.

Though this example is quite favorable in that the incident optical axis and reflected optical axis of probe light can be shifted from each other substantially in parallel even when the irradiating portion 66b and the light-collecting portion 68b are provided on substantially the same plane, so that the setting of these optical axes becomes easier, they can also favorably be provided with other vertical angles, forms, and the like.

For example, opaque frosted glass whose surface is ground with emery or corroded by hydrofluoric acid so as to be matted is also preferably employed for the light-transmitting part 16.

Figure 17A:
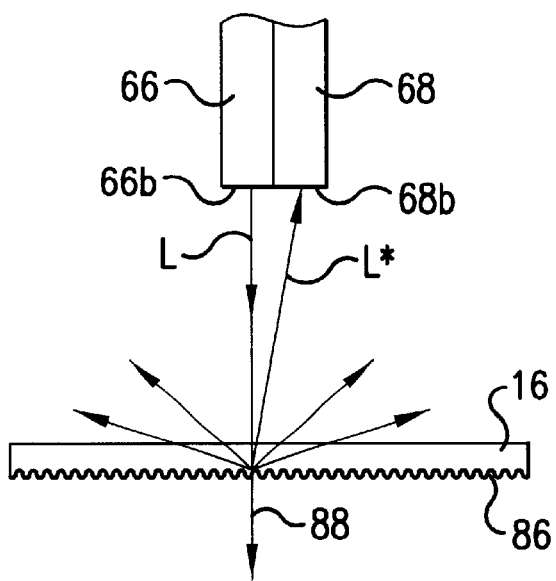
FIGS. 17A and 17B are explanatory views of a modified example of the light-transmitting part shown in FIG. 10.

As a consequence, even in the case where the irradiating portion of the entrance-side fiber and the light-collecting portion of the exit-side fiber are provided on the same plane, the difference in refractive index from that in the frosted glass is greater when no leaked liquid occurs, so that most of the probe light L is fully scattered by the irregularity portion 86 of the frosted glass 16 as shown in FIG. 17A, whereby thus scattered light L can be made incident on the light-collecting portion 68b.

Figure 17B:
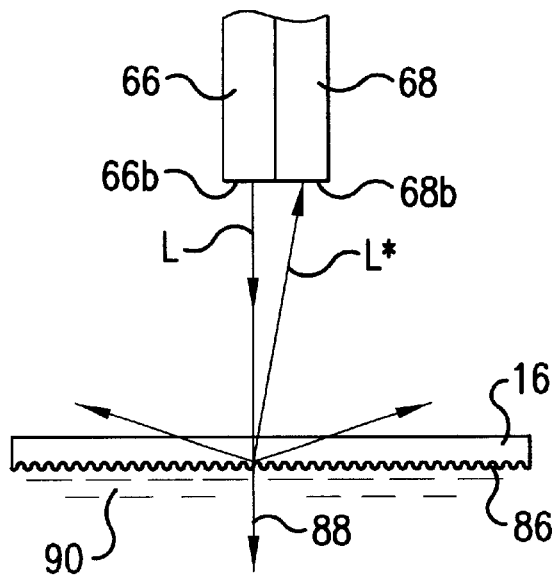

If a leaked liquid 90 occurs as shown in FIG. 17B, on the other hand, the difference in refractive index from that in the frosted glass 16 becomes smaller, so that the ratio of probe light L scattered by the irregularity portion 86 in the frosted glass 16 decreases, by which the ratio of leakage light 88 transmitted through the irregularity portion 86 to the outside increases, whereby the quantity of reflected light L* decreases accordingly.

As a consequence, if the light-transmitting part is formed by the irregularity portion 86 of frosted glass 16, then whether a leaked liquid occurs or not can be detected accurately as in the case provided with the above-mentioned sawtooth irregularity portions each comprising an isosceles triangle with a vertical angle of 90° even when the irradiating portion of the entrance-side fiber and the light-emitting portion of the exit-side fiber are provided on substantially the same plane.

Figure 18:
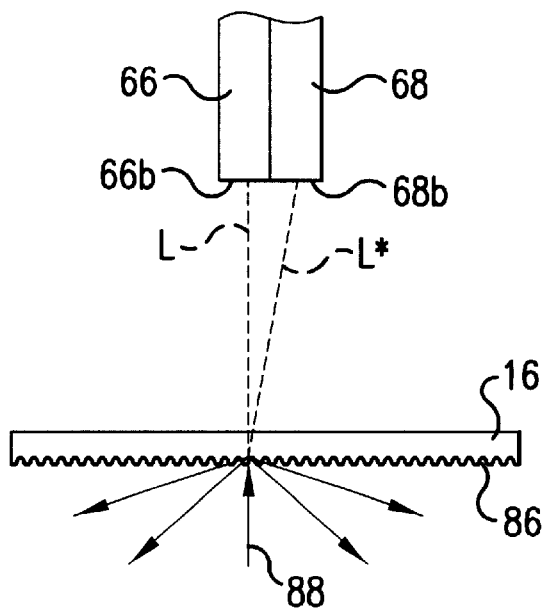
FIG. 18 is an explanatory view of operations of the light-transmitting part shown in FIGS. 17A and 17B.

Also, since the difference in refractive index from that in frosted glass is greater when no leaked liquid occurs, even when the leakage light 88 to the outside is reflected by the region subjected to leak detection so as to return and enter the casing from the irregularity portion 86 as shown in FIG. 18, it is mostly scattered to the outside by the irregularity portion 86, whereby the entrance of light from the region subjected to leak detection caused by the leakage light 88 can be reduced greatly.

Consequently, using the frosted glass 16 can greatly reduce influences of brightness and darkness, coloration, and the like in the region subjected to leak detection, as in the case provided with the above-mentioned sawtooth irregularity portions each comprising an isosceles triangle with a vertical angle of 90°, so that the quantity of reflected light reaching the light-receiving circuit when no leaked liquid occurs can be made more constant, whereby the change in quantity of light when a leaked liquid occurs can be detected more accurately.

As mentioned above, when an optical fiber is used for each connection line, it is usually necessary for the irradiating portion and light-collecting portion of the optical fiber to be set at desirable angles with respect to the light-transmitting part in order to appropriately set the angles of incidence and reflection with respect to the light-transmitting part.

Here, if the optical fiber has a soft and flexible material and structure, then it can be appropriately flexed within the casing so as to be formed with a desirable angle.

However, if a fiber made of silica, synthetic silica, or the like is employed so as to be usable at a high temperature of 150° C. or higher, for example, then it will accompany such a restriction in use as a minimum bending radius of 30 mm or greater. When constructed so as to satisfy this restriction, then the casing becomes too large.

Also, if the front end portions of the entrance-side fiber and exit-side fiber are contained within the casing with a distance therebetween such that desirable angles of incidence and reflection are obtained without being flexed, then its result will contradict demands for simplification, smaller size, robustness, and the like.

If the casing becomes greater, then it limits the place where leaked liquid can be detected and lowers the leaked liquid detection speed. Also, a leaked liquid subjected to detection cannot be detected if its amount is too small, whereby the function of preventing disasters from occurring would lower. Further, it would be disadvantageous in that the cost of making the leak sensor rises, and so forth.

Therefore, it is also preferred in the present invention that the angle of incidence of probe light with respect to the light-transmitting part and the angle of reflection of reflected light from the light-transmitting part can be set appropriately even when the entrance-side fiber and the exit-side fiber are contained within the casing with a shortened distance therebetween so as to be substantially parallel to each other.

Therefore, it is preferred that, for example, a triangular prism having an optimal refractive index be selectively employed depending on its use.

Figure 19:
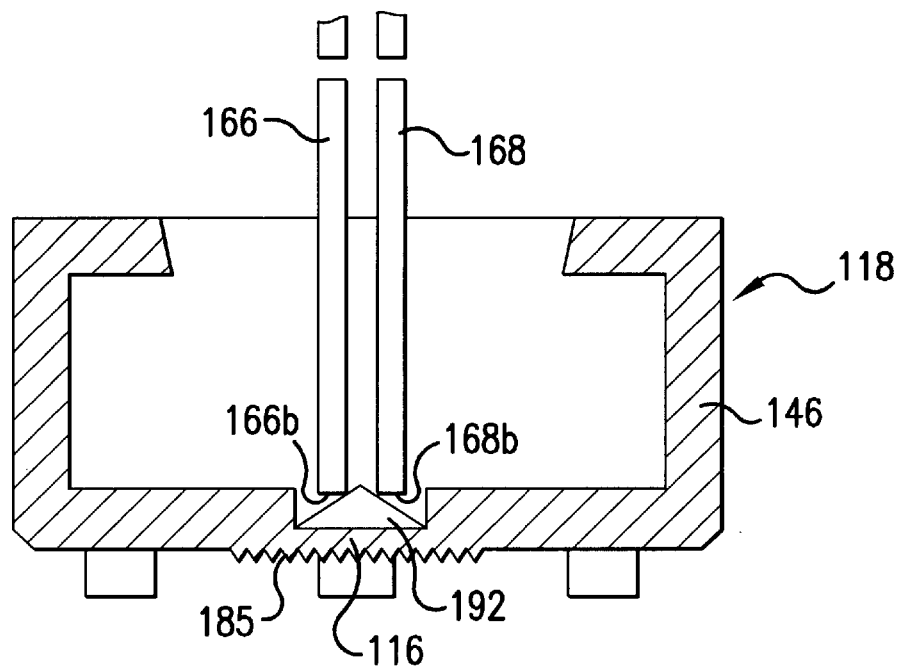
FIG. 19 is a partly broken explanatory view showing an outline of the leak sensor in accordance with a second embodiment of the present invention.
Figure 20:
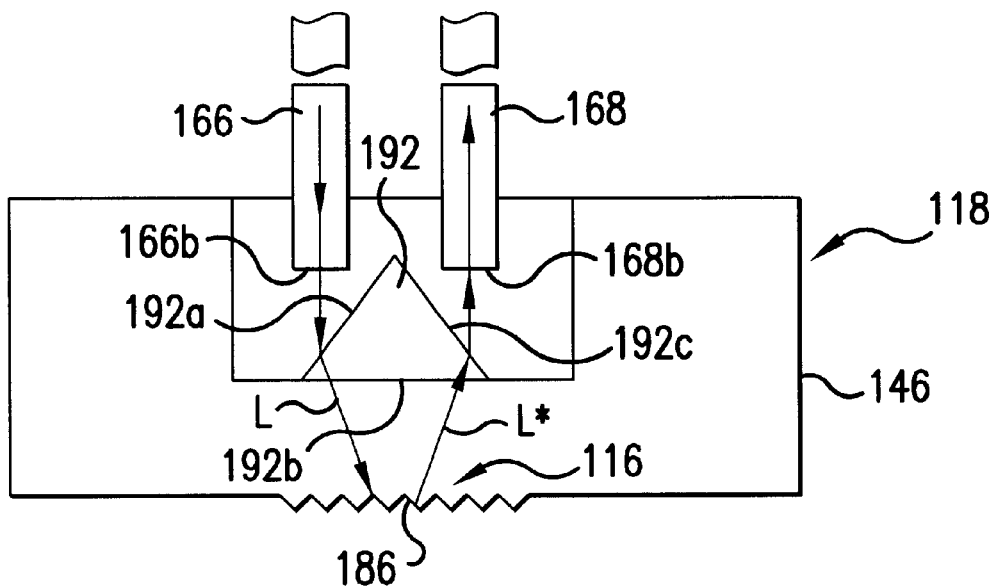
FIG. 20 is an explanatory view of operations of the leak sensor shown in FIG. 19.
Figure 21:
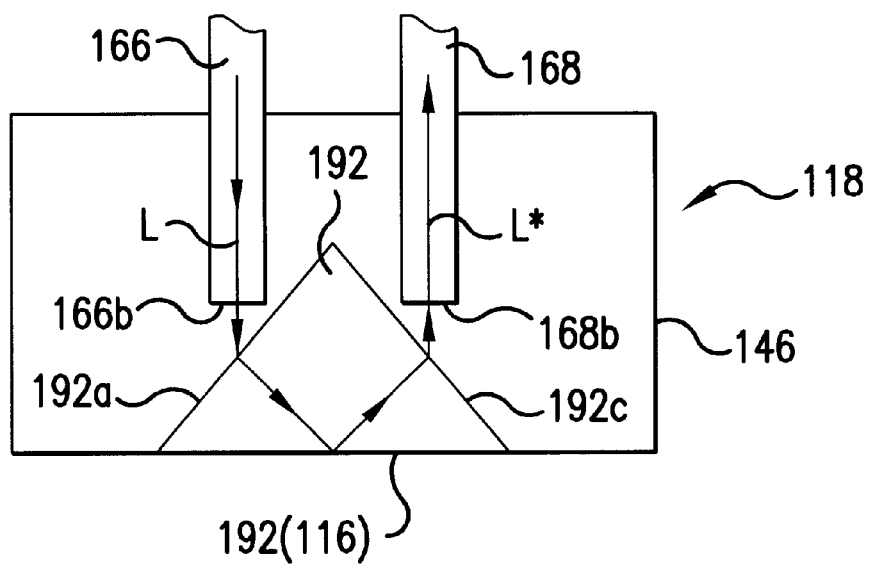
FIG. 21 is an explanatory view in the case where the bottom portion of a triangular prism is used as a light-transmitting part.

FIG. 19 is an explanatory view showing an outline of a leak sensor using a triangular prism, FIG. 20 is an explanatory view showing operations of the triangular prism, and FIG. 21 is an explanatory view showing an embodiment in the case where the bottom portion of the triangular prism is formed as a light-transmitting part. Here, parts corresponding to those of the above-mentioned first embodiment will be referred to with numerals adding 100 to those of the latter, without repeating their explanations.

For example, in the case where individual connection lines are contained within the casing with a shortened distance therebetween so as to be substantially parallel to each other as in the case where optical fibers excellent in heat resistance such as those of silica or synthetic silica are used as the connection lines, a triangular prism 192 constituted by a material such as silica or synthetic silica is provided on the bottom portion within the casing whereas the irradiating portion 166b of the entrance-side fiber 166 and the light-collecting portion 168b of the exit-side fiber 168 are provided so as to be positioned directly above the triangular prism 192 as shown in FIG. 19.

Consequently, as shown in FIG. 20, the probe light L from the irradiating portion 166b is incident on the prism 192 from the left side portion 192a thereof and is refracted within the prism 192 so as to be made incident on the light-transmitting part 116 by way of the bottom portion 192b. The reflected light L* from the light-transmitting part 116 is refracted when being emitted to the outside from the right side portion 192c of the prism 192 so as to be collected by the light-collecting portion 168b.

In the case where the light-transmitting part 116 is less likely to be influenced by the brightness and darkness, coloration, and the like of the region subjected to leak detection, it is also preferred from the viewpoint of simplifying the configuration that the bottom portion 192b of the triangular prism 192 be used as the light-transmitting part 116 as shown in FIG. 21.

In this case, the probe light L from the irradiating portion 166b is incident on the triangular prism 192 from the left side portion 192a and is refracted within the prism 192 so as to be made incident on the bottom portion 192b of the prism 192. The reflected light L* from the bottom portion 192b is refracted when being emitted from the right side portion 192c to the outside of the prism 192, so as to be collected by the light-collecting portion 168b.

As a result, even when the irradiating portion 166b of the entrance-side fiber and the light-collecting portion 168b of the exit-side fiber are contained within the casing so as to be substantially parallel to each other, the leak sensor in accordance with the present invention can appropriately set the angles of incidence and reflection of probe light with respect to the light-transmitting part 116 by using the triangular prism 192 selected in view of the refractive index.

Therefore, even when optical fibers, such as those of silica, excellent in heat resistance but slightly inferior in flexibility are used for connection lines, desirable angles of incidence and reflection can be obtained without flexing these optical fibers, so that the detector can be made smaller, and so forth, whereby the leak sensor of the present invention can be made smaller.

Here, if the leaked liquid is expected to have a large amount when it occurs, for example, the casing 118 may be formed vertically long. It is also preferred in this case that the refractive index of triangular prism be selected in view of the expected state of the subject of detection.

Electric Circuit

Figure 22:
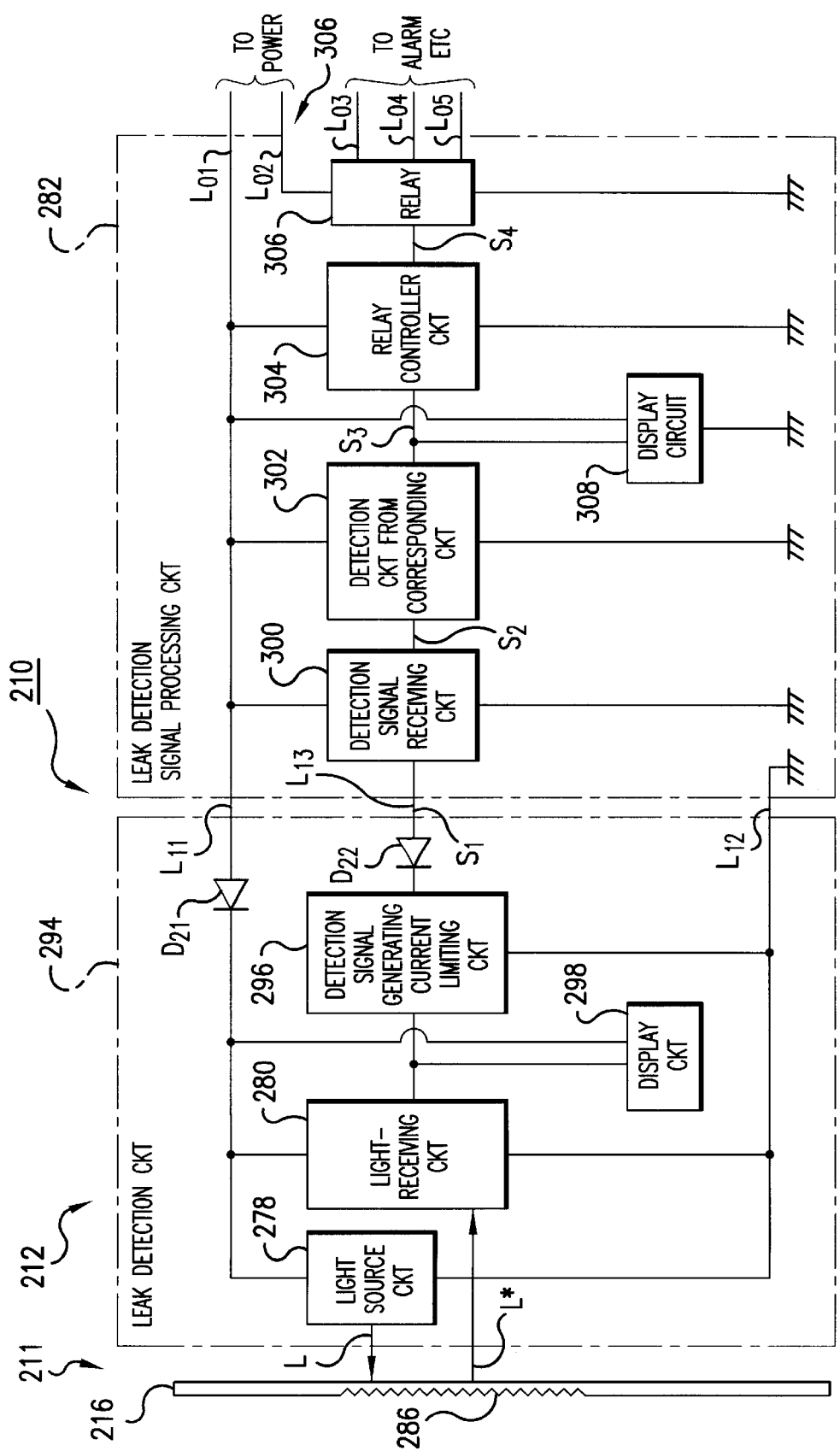
FIG. 22 is an example of electric circuit diagram favorably used in the leak sensor of the present invention.

Though various kinds of amplifiers are usable as the above-mentioned amplifier, one shown in FIG. 22, for example, is preferably used. Here, parts corresponding to those of the above-mentioned configuration will be referred to with numerals adding 100 to those of the latter, without repeating their explanations.

In this drawing, the amplifier 212 comprises a leak detection circuit 294 and a leak detection signal processing circuit (signal processing circuit) 282.

The power input end of the amplifier 212 is connected to an appropriate constant-voltage power supply (not depicted) by way of connection lines (power lines) L01, L02, whereas the power output end thereof is connected to the power input end of the leak detection circuit 294 by way of connection lines (power lines) L11, L12. Also, its signal input end is connected to the signal output end of the leak detection circuit 294 by way of connection lines (power lines) L12, L13. A necessary power is supplied to the power input end of the leak detection circuit 294 by way of the connection lines (power lines) L11, L12. A leak detection signal S1 is received at the signal input end from the signal output end of the leak detection circuit 294 by way of the connection lines (signal lines) L12, L13, thus received signal is processed, and the result of processing is sent from the signal output end to its downstream alarm device (not shown) by way of connection lines (signal lines) L03 to L05.

The leak detection circuit 294 comprises a light source circuit 278, a light-receiving circuit 280, a detection signal generating current limiting circuit 296, and a display circuit 298.

The light source circuit 278 has an input end connected to the cathode of a diode D21.

One end of the light-receiving circuit 280 is connected by way of the diode D21 to the other end portion of the connection line (power line) L11, whose one end portion is connected to the leak detection signal processing circuit 282 so as to supply an appropriate power thereto, whereas the other end thereof is directly connected to the other end portion of the connection line (grounding line) L12.

The input end of the detection signal generating current limiting circuit 296 is connected to the output end of the light-receiving circuit 280.

The input end of the display circuit 298 is connected to the output end of the light-receiving circuit 280.

Therefore, the light source circuit 278 generates probe light L and emits it toward the irregularity portion 286 of the light-transmitting part 216.

The probe light L emitted by the light source circuit 278 is reflected by the irregularity portion 286 of the light-transmitting part 216, and the light-receiving circuit 280 receives thus reflected light L*.

The detection signal generating current limiting circuit 296 detects changes in the light-receiving circuit 280 corresponding to changes in quantity of reflected light L* caused by leaked liquid, and outputs the result of detection as the leak detection signal S1 to the leak detection signal processing circuit 282 and the display circuit 298.

The display circuit 298 displays the fact that the leak detection signal S1 is emitted, so as to make it visible from the outside.

On the other hand, the leak detection signal processing circuit 282 comprises a detection signal receiving circuit 300, a detection circuit form corresponding circuit 302, a relay controller circuit 304, a relay 306, and a display circuit 308.

The detection signal receiving circuit 300 is inserted between the other end portion of the connection line (power line) L01, whose one end portion is connected to the appropriate constant-voltage power supply (not depicted), and the ground. Its signal input end is connected to the signal output end of the leak detection circuit 294 by way of the connection lines L12, L13.

The detection circuit form corresponding circuit 302 is inserted between the other end portion of the connection line L01 and the ground, whereas its signal input end is connected to the signal output end of the detection signal receiving circuit 300.

One power input end of the relay controller circuit 304 is connected to the connection line L01, its other power input end is grounded, and its signal input end is connected to the signal output end of the detection circuit form corresponding circuit 302.

One power input end of the relay 306 is connected to the other end portion of the connection line L02, whereas the other power input end thereof is grounded.

One power input end of the display circuit 308 is connected to the other end portion of the connection line L01, its other power input end is grounded, and its signal input end is connected to the output end of the detection circuit form corresponding circuit 302.

Therefore, when the leak detection signal S1 is supplied from the leak detection circuit 294 along with the occurrence of a leaked liquid, the detection signal receiving circuit 300 generates a leak detection receiving signal S2.

In order for the fact that the leaked liquid has occurred to be transmitted as a low-level signal regardless of differences in the form of occurrence of the leak detection signal S1 along with the leak detection effected by the leak detection circuit 294, the detection circuit form corresponding circuit 302 outputs as a leak detection standardization signal S3 the leak detection receiving signal S2 supplied from the detection signal receiving circuit 300.

When the leak detection standardization S3 is supplied from the detection circuit form corresponding circuit 302, the relay controller circuit 304 generates and outputs a relay control signal S4.

The relay 306 is driven when the relay control signal S4 is supplied from the relay controller circuit 304, so as to generate a leak occurrence signal and supply it by way of connection lines (grounding lines) L03 to L05 to its downstream alarm device (not depicted) and the like.

When the leak detection standardization signal S3 is supplied from the detection circuit form corresponding circuit 302, the display circuit 308 displays the fact that a leaked liquid occurs, so as to make it visible from the outside.

When no leak detection standardization signal S3 is supplied from the detection circuit form corresponding circuit 302, on the other hand, the display circuit 308 displays the fact that no leaked liquid occurs, so as to make it visible from the outside.

What is claimed is:

1. A leak sensor including a light-transmitting part constituted by a transparent or semitransparent material, said leak sensor irradiating said light-transmitting part with probe light in a state where said light-transmitting part is provided so as to face into a region subjected to leak detection, and detecting a leaked liquid according to a change in quantity of light reflected by a boundary between said light-transmitting part and said region subjected to leak detection;

said leak sensor comprising attachment means for installing said leak sensor in said region subjected to leak detection, said attachment means comprising a ground portion grounded on said region subjected to leak detection; and a mounting portion, rising from said ground portion, adapted to mount said leak sensor in a state where said light-transmitting part is parallel to said ground portion and in a state where a predetermined space is formed therebetween.

2. A leak sensor according to claim 1, wherein a surface of said ground portion opposing said light-transmitting part is subjected to a surface treatment for reducing a surface tension of the leaked liquid on said ground portion.

3. A leak sensor according to claim 1, further comprising a conduit portion formed in said ground portion so as to guide the leaked liquid to substantially a center part between said light-transmitting part and said ground portion.

4. A leak sensor according to claim 1, further comprising:

an electric system for generating probe light for irradiating said light-transmitting part, photoelectrically converting the light reflected by said boundary between said light-transmitting part and said region subjected to leak detection, and detecting the leaked liquid according to a change in an output thereof;

an optical system, including said light-transmitting part, for irradiating said light-transmitting part with said probe light from said electric system and collecting said light reflected from said light-transmitting part;

a casing provided with said optical system such that said light-transmitting part is directed to said region subjected to leak detection, while being separated from said electric system; and a connection line for connecting said optical system provided in said casing and said electric system to each other, guiding said probe light obtained by said electric system to said optical system, and guiding to said electric system the reflected light from said light-transmitting part obtained by said optical system;

said optical system provided in said casing being installed within said region subjected to leak detection, said electric system being installed at a place separated from said region subjected to leak detection, said optical system and said electric system being connected to each other by said connection line.

5. A leak sensor according to claim 4, wherein said connection line is an optical fiber comprising:

an entrance-side fiber guiding said probe light from said electric system and having an irradiating portion for emitting said light toward said light-transmitting part; and an exit-side fiber having a light-collecting portion for collecting the reflected light from said light-transmitting part and guiding the light from said light-collecting portion to said electric system.

6. A leak sensor according to claim 4, wherein, in said light-transmitting part, a boundary surface with respect to said region subjected to leak detection or a surface for inputting and outputting said probe light is formed with an irregularity portion.

7. A leak sensor according to claim 6, wherein said irregularity portion is a sawtooth irregularity portion having a sectional form comprising an isosceles triangle with a vertical angle of 90°.

8. A leak sensor according to claim 5, further comprising a holding member adapted to hold, in a state installed within said casing above said light-transmitting part, at least said irradiating portion of said entrance-side fiber and said light-collecting portion of said exit-side fiber such that said irradiating portion and said light-collecting portion form a predetermined angle with respect to said light-transmitting part.

9. A leak sensor according to claim 5, further comprising a transparent or semitransparent triangular prism provided within said casing above said light-transmitting part; said prism refracting said probe light incident thereon from said irradiating portion of said entrance-side fiber such that said probe light is incident on said light-transmitting part, and refracting said reflected light incident thereon from said light-transmitting part such that said reflected light is incident on said light-collecting portion of said exit-side fiber;

said irradiating portion of said entrance-side fiber and said light-collecting portion of said exit-side fiber being provided above said prism within said casing.

10. A leak sensor according to claim 5, further comprising a transparent or semitransparent triangular prism within said casing in a state where bottom portion of said prism as said light-transmitting part is faced into a region subjected to leak detection, and having a reactive index substantially identical to the refractive index of the leaked liquid;

said irradiating portion of said entrance-side fiber and said light-collecting portion of said exit-side fiber being provided above said prism within said casing;

said prism refracting said probe light incident thereon from said irradiating portion of said entrance-side fiber such that said probe light is incident on said bottom portion thereof, and refracting said reflected light incident thereon from said bottom portion thereof such that said reflected light is emitted to said light-collecting portion of said exit-side fiber.

11. A leak sensor according to claim 4, wherein said casing comprises a connection line drawing portion provided with an opening through which said connection line can be inserted; and a cap provided with an inner peripheral portion which, while being attached to said connection line drawing portion, can press an outer peripheral portion of thus attached part of said connection line drawing portion toward a center axis thereof.

\* \* \* \* \*